G. R. CHAMBERLAIN & A. G. SCHROEDER.
GAS FIXTURE.
APPLICATION FILED SEPT. 12, 1910.
1,019,131.  Patented Mar. 5, 1912.
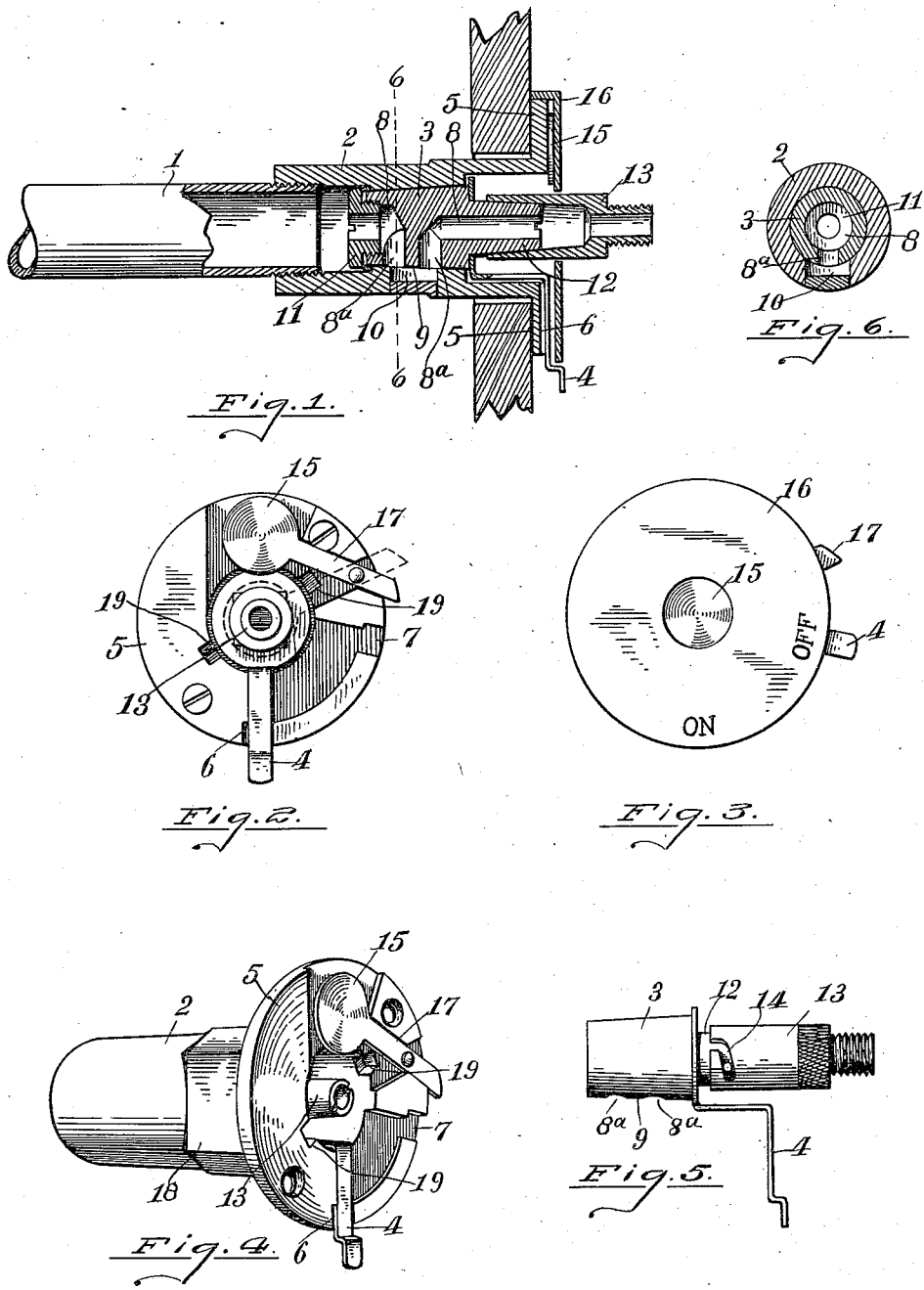
Witnesses
Harold O. Van Antwerp
Minnie Thompson.
Inventors
Glenn R. Chamberlain
and Albert G. Schroeder
By Luther V. Moulton
Attorney

UNITED STATES PATENT OFFICE.

GLENN R. CHAMBERLAIN AND ALBERT G. SCHROEDER, OF GRAND RAPIDS, MICHIGAN.

GAS-FIXTURE.

1,019,131.  Specification of Letters Patent.  Patented Mar. 5, 1912.

Application filed September 12, 1910. Serial No. 581,484.

*To all whom it may concern:*

Be it known that we, GLENN R. CHAMBERLAIN and ALBERT G. SCHROEDER, citizens of the United States of America, residing at Grand Rapids, in the county of Kent and State of Michigan, have invented certain new and useful Improvements in Gas-Fixtures; and we do hereby declare the following to be a full, clear, and exact description of the invention, such as will enable others skilled in the art to which it appertains to make and use the same.

Our invention relates to improvements in gas fixtures, and its object is to provide a fixture to which a burner or tube may be detachably connected, and when the same is detached the fixture may be closed; to provide a device that will lie close to the wall and present a neat appearance, and to provide the same with various new and useful features as hereinafter more fully described and particularly pointed out in the claims, reference being had to the accompanying drawings, in which:

Figure 1 is a longitudinal vertical section of a device embodying our invention; Fig. 2 a front view of the same with the cap removed; Fig. 3 the same with cap in place thereon; Fig. 4 a perspective of the same as shown in Fig. 2; Fig. 5 a detail of the valve plug and coupling; and Fig. 6 a transverse section on the line 6—6 of Fig. 1.

Like numbers refer to like parts in all of the figures.

1 represents any convenient gas pipe to which the device may be attached; 2 the valve body proper having an axial opening screw-threaded to receive the end of a pipe 1 at one end, and provided with a flange 5 at the other end. In the axial opening is a tapered valve plug 3 rotative therein and ground to fit. This plug has an axial opening 8 extending nearly through the same and separated by a solid portion 9 near the middle of the plug, at each side of which are lateral openings 8ª communicating with the respective axial openings, and in the valve body is a chamber 10 which when the openings 8ª are opposite the same will provide a passage through the valve, and when the openings 8ª are turned away from the same the valve is closed. To rotate and hold this plug 3 a spring arm 4 is attached thereto, and extends between the flange 5 and a cap 16. This arm detachably engages recesses 6 and 7 to hold the plug in open and closed positions. The plug is also provided with a nipple 12 to which is attached any convenient coupling 13 for connecting a hose or burner to the valve. This coupling is detachably held in place on the nipple by a bayonet lock 14 as shown in Fig. 5.

A cap 16 is provided to cover the flange and form a finish to the device, which cap is provided with the words "On" and "Off" respectively opposite the recesses 6 and 7 to indicate the positions of the lever 4 when the valve is open or closed. This cap is also provided with a central opening to permit the coupling 13 to extend therethrough. When this coupling is detached, this opening is closed by a disk 15 carried on the inner end of a lever 17 projecting outside the cap at the outer end, whereby the disk 15 may be moved opposite the opening in the cap to close the same, or away from the opening to permit the insertion of the coupling.

A take-up nut 11 is provided for the plug 3 to hold the same in place, and this nut and the end of the nipple 12 are each provided with a transverse nick or recess to receive the end of a screw driver for rotating the nut to tighten the plug, or rotating the plug to grind the same in place, as occasion may require. The body is also provided with a hexagon portion 18 to apply a wrench, as occasion may require. In some cases where the device is to be applied, this part would be inaccessible as for instance in Fig. 1. For such cases we provide recesses 19 at opposite sides of the outer end of the axial opening of the body in which recesses a suitable tool can be inserted to turn the body for attaching it to a pipe 1, or detaching it therefrom.

What we claim is:

1. A gas fixture, comprising a valve body having an axial opening therethrough adapted to receive a pipe at the inner end and having a chamber surrounded by a flange at the outer end, a rotative plug in the said axial opening adapted to open or close the same, a nipple on the plug within the chamber and adapted to receive a coupling, a cap covering the flange and having an opening opposite the nipple, an arm on the plug projecting outside the flange and cap and movable therebetween to turn the plug and a disk to close the opening in the cap mounted on a pivoted lever projecting outside the flange and cap and movable therebetween.

2. A gas fixture, comprising a valve body having an axial opening therethrough adapted to receive a pipe at the inner end, a flange on the outer end of the body having recesses therein, a plug rotative in the said opening and having its axis coinciding with the axis of the opening, a passage through the plug opened and closed by rotation of the same, a spring arm on the plug alternately engaging the recesses in the flange to adjust the plug to open and closed positions, a nipple on the outer end of the plug and within the body, a coupling detachably connected to the nipple and means for closing the outer end of the body when the coupling is detached.

3. A gas fixture, comprising a valve body having an axial opening therethrough, a plug rotative in said opening, and having an opening therethrough opened and closed by rotation of the plug, an arm on the plug to adjust and hold the same, a flange on the outer end of the body having recesses to receive the arm, a cap on the flange having a central opening opposite the plug, and a closure for said opening movable between the flange and cap.

4. A gas fixture, comprising a valve body having an axial opening extending therethrough and adapted at the inner end to receive a pipe, a plug rotative in said opening and having an opening therethrough opened and closed by the rotation of the plug, a nipple on the outer end of the plug and within the body, an arm on the plug to adjust the same to open and closed position, a flange on the body having recesses to receive the arm and hold the same, a cap on the flange having a central opening, a coupling detachably secured to the nipple and extending through said opening, a disk to close said opening movable between the flange and cap, and a lever carrying the disk and extending outside the flange and cap.

In testimony whereof we affix our signatures in presence of two witnesses.

GLENN R. CHAMBERLAIN.
ALBERT G. SCHROEDER.

Witnesses:
HAROLD O. VAN ANTWERP,
LUTHER V. MOULTON.

Copies of this patent may be obtained for five cents each, by addressing the "Commissioner of Patents, Washington, D. C."